United States Patent [19]

Zacharias

[11] Patent Number: 4,908,978
[45] Date of Patent: Mar. 20, 1990

[54] INSECT IMPELLER AND DESTROYER

[76] Inventor: Michael E. Zacharias, 335 Main St., Springport, Mich. 49284

[21] Appl. No.: 352,025

[22] Filed: May 15, 1989

[51] Int. Cl.⁴ .............................................. A01M 1/04
[52] U.S. Cl. .................................... 43/111; 43/112; 43/113
[58] Field of Search .................. 43/110, 111, 112, 113

[56] References Cited

U.S. PATENT DOCUMENTS

| | | |
|---|---|---|
| 1,693,368 | 11/1928 | Cherry . |
| 2,778,150 | 1/1957 | Pohlman ............................. 43/139 |
| 2,780,026 | 2/1957 | Dail et al. ........................... 43/139 |
| 3,020,671 | 4/1960 | Potter ................................. 43/113 |
| 3,041,773 | 2/1959 | Gagliano ............................ 43/113 |
| 3,196,577 | 4/1962 | Plunkett ............................. 43/113 |
| 3,319,374 | 5/1967 | Gawne ............................... 43/112 |
| 3,965,608 | 6/1976 | Schuman ............................ 43/110 |
| 4,387,529 | 6/1983 | Hedstrom ........................... 43/112 |
| 4,422,015 | 12/1988 | Nilssen .............................. 315/209 |
| 4,852,296 | 8/1989 | Swanson ............................. 43/112 |
| 4,856,226 | 8/1989 | Taylor ................................ 43/112 |

*Primary Examiner*—Nicholas P. Godici
*Assistant Examiner*—Mike Starkweather
*Attorney, Agent, or Firm*—Charles W. Chandler

[57] ABSTRACT

A battery-powered fan in a portable device produces a stream of air in a housing to draw insects into contact with two electrodes. The device includes a battery-powered voltage generator to produce a sufficiently high difference of potential across the electrodes to destroy insects connecting both electrodes at the same time. The direction of rotation of the fan rotor may be reversed to blow the remains of the insects out of the housing.

11 Claims, 2 Drawing Sheets

INSECT IMPELLER AND DESTROYER

BACKGROUND OF THE INVENTION

This invention relates to a portable device that includes conductive grids close enough to each other to be bridged by an insect and connected to a source of voltage having a magnitude sufficient to force a fatal current through an insect. The grids are in a portable structure that also includes means for generating a current of air that can be brought to bear upon an insect to draw it into the grids and thereby destroy it.

The devices used heretofore to electrocute insects have large structures permanently mounted on supporting means and connected to a source of house current. Such a device requires that the insect be attracted to it by a lamp. When the insect gets close enough, it enters a stream of moving air produced by a fan associated with the device, and this stream pushes the insect the rest of the way into contact with the electrode structure that kills it. Such devices are shown by Gawne in U.S. Pat. No. 3,319,374; Headstrom in U.S. Pat. No. 4,387,529; and by Nilssen in U.S. Pat. No. 4,422,015.

Other existing devices also depend on a lamp to attract the insect into a moving stream of air, but instead of electrocuting the insect, it is forced into a container from which it cannot escape. Such devices are shown in U.S. Pat. No. 1,693,368 to Cherry; U.S. Pat. No. 2,780,026 to Dail, et al.; and U.S. Pat. No. 2,778,150 to Pohlman.

Schuman discloses a manually operated device for producing a vacuum. The device also has a light to attract insects, and the intake part of the device can be brought into the vicinity of an insect at which time a valve can be opened to cause the vacuum to draw the insect the rest of the way into a container.

OBJECTS OF THE INVENTION

It is a principal object of this invention to provide a portable device that produces a stream of air to impel an insect into contact with two electrodes between which there is a voltage high enough to cause a fatal current to flow through any insect that touches both electrodes simultaneously.

In accordance with the invention, a device light enough to be moved easily by hand includes an electrically operated fan to produce a stream of air strong enough to force an insect into the device. Electrode means, such as conductive grids, are located so that the stream of air has to pass through them, and are connected to a voltage generator that produces a voltage high enough to electrocute the insects. One terminal of the voltage generator is connected to one of the grids and the other terminal is connected to the other grid. If the grids are so arranged that one is downstream from the other, the mesh of the downstream grid should be small enough to capture any of the insects to be killed. The mesh of the upstream grid can be made somewhat larger to allow the insects to pass at least far enough through it to make contact with both grids at the same time.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DETAILED DESCRIPTION OF THE INVENTION

Figure 1:
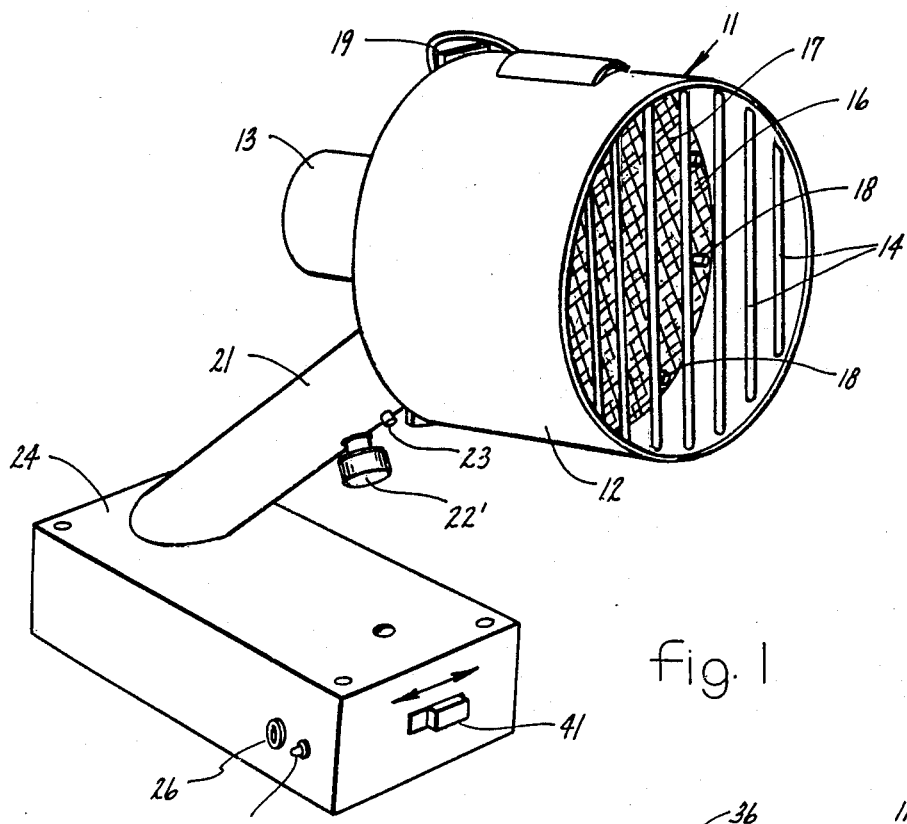
FIG. 1 is a perspective view of a device for pulling in insects and electrocuting them according to this invention.

The device 11 in FIG. 1 is a portable structure that includes an outer casing 12 that constitutes a duct for a fan motor 13. The casing 12 is made of insulating material that includes an insulating barrier 14 at one end. In this embodiment, the barrier is a series of insulating posts spaced close enough together to prevent even a child's finger from being inserted between them. Behind the barrier 14 and spaced far enough from it to be certain that no human can come into contact with it, is an electrode structure comprising means in which insects are to be electrocuted. In this embodiment, the electrode means include a first grid 16 of relatively large mesh, such as hardware cloth having a mesh of about $\frac{1}{4}'' \times \frac{1}{4}''$. Behind the grid 16 is a second part of the electrode means comprising a second grid 17 of smaller mesh, typically $\frac{1}{8}''$ by $\frac{1}{8}''$. Standard metal window screen material is satisfactory for the grid 17, which is spaced from, and electrically insulated from, the grid 16 by several insulating spacers 18. The perimeter of at least one of the grids is rigidly attached to the inner wall of the duct 12 to hold both grids so that their planes are parallel to each other and perpendicular to the axis of the duct.

At the back of the duct 12 is a support 19 rigidly attached to the duct and to the motor 13 to keep the motor in position relative to the duct. Also attached to the support 19 is a shaft 21 that serves as a handle by which the device 11 may be moved around. The handle is also insulated and is covered by an outer layer of foam rubber or the like. In this embodiment, two switches 22 and 23 are mounted on the handle 21, the first to control the operation of a high-voltage generating circuit in the device 11 and the second to turn the fan motor 13 on and off. The lower end of the handle is joined to a base 24 that serves as a housing for a battery power supply to provide the necessary current to drive the motor 13 and to produce the electrical voltage applied to the grids 16 and 17. A receptacle 26 is mounted on one side of the base 24 to receive a jack from a battery charger (not shown), and a light 27 is mounted alongside the receptacle 26 to indicate when the battery is being charged. A third switch 25 is also mounted on the base 24 to control the direction of rotation of the fan and, therefore, the direction of flow of air through the duct 12.

Figure 2:
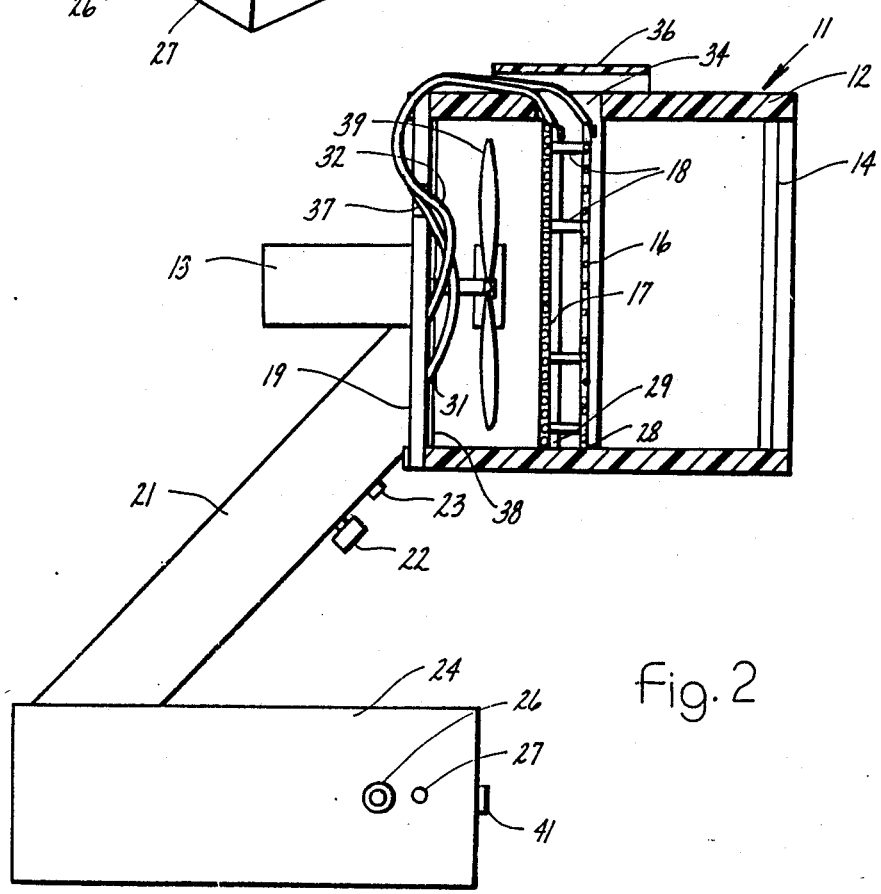
FIG. 2 shows the device in FIG. 1 partially in cross section to show the interior structure.

FIG. 2 shows the duct 12 in cross section. The grid 16 is attached to the inner surface of the duct by an inner ring of adhesive 28, and the grid 17 is attached by a similar ring 29. Connection wires 31 and 32 are provided for the grids 16 and 17, respectively. These wires feed through a hole 34 in the top of the duct 12, and this hole is protected by a semi-cylindrical shell 36. The wires extend out through the open back end of the shell, down past part of the support 19, through a hole 37 in that support, and through a protective wire grid 38 across the back end of the duct. The wires are so routed that they do not come in contact with a fan 39 driven by the motor 13, but, instead, pass down into the handle 21 and to the electrical circuit that includes the switch 23 and other components in the base 24.

The protective grid 38 may be of the same material as the grid 17 or it can be made of insulating material. It is essential that it allow the free flow of the air stream that must pass through the grids 16, 17 and 38, as well as the barrier 14 at the front end of the duct 12. This air flow is produced by rotation of the fan 39, and its normal direction is such that insects caught up in it are forced to pass through the gaps in the barrier 14 and into the grid 16. Because of this direction of flow, it is considered that the grid 16 is downstream of the barrier 14, the grid 17 is downstream of the grid 16, and the grid 38 is downstream of the grid 17. This normal direction of flow brings insects into the duct 12 with sufficient force to cause at least part of each insect to pass far enough through the grid 16 to come into contact with the grid 17 while at least another part of the insect remains in contact with the grid 16. The voltage between the grids causes a fatal current to flow through the insect.

It happens on occasion that it is necessary, or at least desirable, to get rid of the remains of the insects electrocuted between the grids 16 and 17. This can be done by reversing the flow of the air through the duct 12, which can be accomplished by reversing the direction of rotation of the fan 39 by means of the reversing switch 25 in the circuit of the motor 13.

Figure 3:
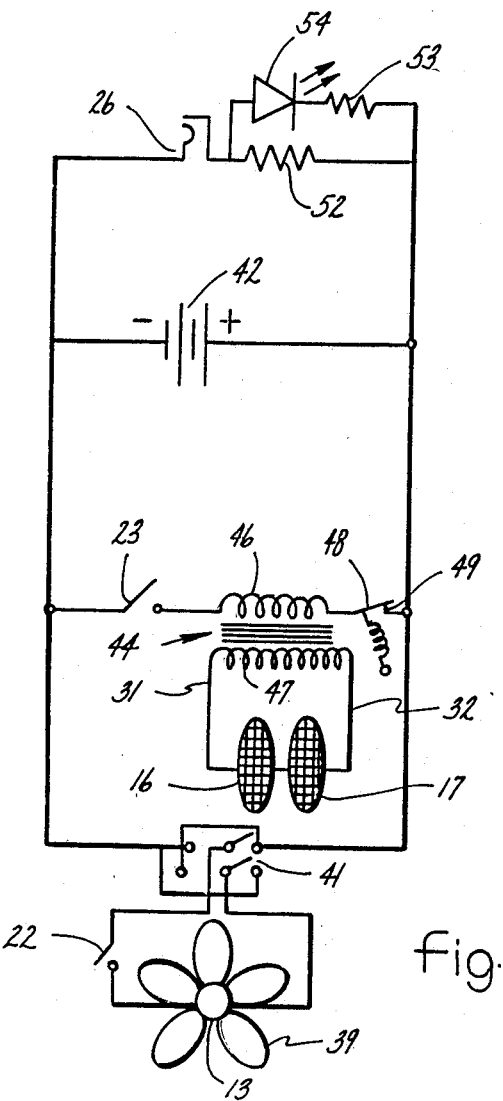
FIG. 3 is an electrical circuit diagram of the electrical components in the device in FIG. 1.

The power supply for the device 11 is shown in the circuit in FIG. 3 as being a battery 42 which, in this embodiment, consists of four Ni-Cad cells in series. Each of the cells has a voltage of about 1.25 volts and so the entire battery 42 has a voltage of about 5 volts. Terminals of the battery are connected to the two arms of the double-pole, double-throw, reversing switch 25, and one of the sets of fixed terminals of this switch is connected to the On/Off switch 23 that controls rotation of the fan motor 13. The direction of rotation is determined by which way the arms of the switch 25 are thrown.

The high-voltage, high-frequency, circuit for the device 11 includes a combined relay-transformer 44 that has a primary winding 46 and a secondary winding 47. The primary winding acts as a relay to control movement of a resiliently biased arm 48 that normally makes connection with a fixed contact 49 connected to one of the terminals of the battery 42. The opposite end of the primary winding of 46 is connected through the switch 22 to the other terminal of the battery, and when this latter switch is closed, the current flow through the primary winding causes the arm 48 to be pulled away from the fixed contact 49 by a magnetic field produced by current flowing in the primary winding, thereby interrupting the primary current and allowing the resiliently biased arm to return to connection with the contact 49. This back-and-forth vibratory motion of the arm 48 continues as long as the switch 22 remains closed.

The pulses of current through the primary winding 46 induce a voltage in the secondary winding 47. The turns ratio between the secondary winding 47 and the primary winding 46 is typically of the order of 500:1 so that the voltage across the secondary winding is stepped up from that across the primary winding by approximately this ratio. The two ends of the secondary winding are directly connected by the wires 31 and 32 to the grids 16 and 17 to produce a voltage difference of about 2000–2500 v. between the grids.

In order to recharge the battery 42, one terminal of the receptacle 26 is connected to one of the terminals of the battery and the other terminal is connected through a resistor network that comprises a resistor 52 in series with the battery 42 and another resistor 53 in series with a light-emitting diode (LED) 54 and the battery. This causes the LED to emit light when the battery is being charged.

Figure 4:
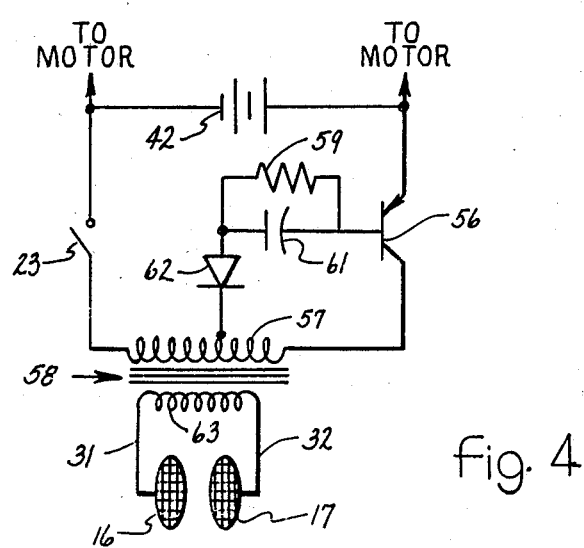
FIG. 4 is an alternative circuit diagram for the high-voltage generating circuit in the device in FIG. 1.

The circuit in FIG. 4 can be used to generate the high voltage in place of the electro-mechanical circuit in FIG. 3. The high voltage generating circuit in FIG. 4 includes a transistor 56, the emitter of which is connected to the positive terminal of the battery 42 and the collector of which is connected to one terminal of the primary winding 57 of a transformer 58. The base of the transistor 56 is connected through a parallel RC circuit, which consists of a resistor 59 and a capacitor 61 in series with a diode 62 to an intermediate tap on the primary winding 57 of the transformer 58. This circuit constitutes an oscillator circuit, and the step-up ratio from the primary winding 57 to the secondary winding 63 is such that the voltage across the secondary winding is on the order of 6,000 volts. However, the circuit is not capable of generating high enough power to be dangerous to humans if they somehow get past the barriers 14 and 38 at the front and back ends of the duct 12. The terminals of the secondary winding are connected by way of the wires 31 and 32 to the grids 16 and 17, respectively, as in the case of the circuit in FIG. 3.

The device 11 in FIG. 1 can be operated by causing the switch 25 to send direct current through the motor 13 in the proper direction to rotate the fan 39 to pull air into the front end of the duct 12 through the barrier 14. It is not necessary that the motor be caused to operate continuously; it can be turned on by voluntary actuation of the switch 22 by the user any time an insect appears in the vicinity. Since the device 11 is portable and weighs just under three pounds, it can easily be moved by hand to a location as close as possible to the insect. As long as the front end of the duct 12 is within about 4 inches of a fly, for example, operation of the fan 39 will cause the fly to be drawn into the duct and at least partially through the grid 16 so as to be in contact with that grid and the grid 17. The switch 22 that controls generation of high voltage can be held closed during this entire time, or it can be closed only after the insect is known to be inside the duct. The high voltage applied to the grids whenever the switch 22 is closed is enough to produce a fatal current to flow through the insect. In many instances, a voltage much below 2000 v. may be entirely adequate.

I claim:

1. In a portable electronic insect-attracting and killing device that includes a motor, a fan connected to the motor to be rotated thereby to move a stream of air, an annular duct surrounding the fan, support means for physically connecting the motor and the duct to hold them in fixed relation to each other, first and second air-permeable barrier means across the stream of air on opposite sides of the fan to form, with the duct, a protective housing to prevent human beings from touching the fan while allowing insects to be drawn through the upstream barrier means to the inside of the housing by the stream of air, and first and second electrode means spaced from each other and electrically insulated from each other within the housing, the first and second electrode means being close enough together so that both of them can be contacted simultaneously by an insect, both of the electrode means being sufficiently far removed from each of the barrier means to be inaccessible to any part of an adult or child, the invention comprising:
 a battery power supply to supply power to run the motor;
 a high-voltage generator connected to the battery power supply and to the first and second electrode means to supply oppositely polarized voltage to the grids;
 a handle attached to the duct to provide means to move the device to capture an insect in the stream of air flowing through the electrode means in that order;
 wherein the electrode means comprises first and second electrically conductive grids substantially parallel to each other and substantially perpendicular to the stream of air passing through the duct; and
 wherein the first grid is downstream from the second grid in the stream of air, and the second grid has openings substantially larger than the first grid to allow an insect to be drawn sufficiently far through the openings in the second grid to make electrical contact with the first grid while remaining in contact with the second grid.

2. The device of claim 1, in which the first grid is a first wire screen comprising a first set of wires extending in one direction parallel to each other and being approximately ⅛" apart and a second set of wires perpendicular to the wires of the first set and interwoven therewith and spaced approximately ⅛" apart, and the second grid is a second comprising third and fourth mutually perpendicular sets of wires interwoven with each other with the wires in each of the third and fourth sets being spaced apart at least about three times as far as the wires of each of the first and second sets are spaced apart.

3. The device of claim 1, comprising a reversing switch connected in series between the motor and the battery power supply to control the direction of rotation of the motor and the fan and, thereby, the direction of movement of the stream of air, whereby live insects are first pulled into contact with both the first and second electrode means simultaneously to be electrocuted by the voltage between the electrode means, the remains of the electrocuted insects thereafter being blown out of the housing by reversal of the direction of movement of the stream of air.

4. The device of claim 1, in which the first barrier means is adjacent one end of the annular duct and is made of insulating material, the first and second electrode means being between the first barrier means and the fan.

5. The device of claim 1, comprising a stand including a base and a handle extending upwardly from the base to the housing to support the housing and the motor, the device further comprising switch means located on the handle and connected to the battery power supply, the motor, and the high-voltage generator to turn the motor on and off as desired and to turn the high voltage generator on and off as desired.

6. The device of claim 5, in which the second barrier means is electrically insulated from both of the first and second electrode means and disposed across the opposite end of the duct from the first barrier means.

7. A portable electronic insect-attracting and killing device comprising:
 a battery-powered motor;
 a fan connected to the motor to be driven thereby to move a stream of air;
 an annular duct surrounding the fan to concentrate the stream of air and prevent human contact with the fan;
 support means for physically connecting the motor and the duct to hold them in fixed relation to each other;
 a handle attached to the duct to provide means to carry the device around;
 air-permeable, electrically insulated barrier means across the stream of air on opposite sides of the fan and mechanically attached to the duct to form therewith a protective housing to prevent human beings from touching the fan while allowing insects to be drawn through at least the upstream barrier means to the inside of the housing by the stream of air;
 first and second electrode means electrically insulated from each other within the housing but close enough together so that both of them can be contacted simultaneously by an insect, both of the electrode means being sufficiently far removed from each of the barriers to be inaccessible to any part of an adult or child;
 a battery power supply; and
 a high-voltage generator connected to the battery power supply to receive operating power therefrom and to the first and second electrode means to apply oppositely polarized voltage substantially higher than the battery voltage to the grids;
 wherein the electrode means comprises first and second electrically conductive grids substantially parallel to each other and substantially perpendicular to the stream of air passing through the duct; and
 wherein the first grid is downstream from the second grid in the stream of air, and the second grid has openings substantially larger than the first grid to allow an insect to be drawn sufficiently far through the openings in the second grid to make electrical contact with the first grid while remaining in contact with the second grid.

8. The device of claim 7, comprising in addition, a base attached to the opposite end of the handle from the duct to provide a stand for the device.

9. The device of claim 8, comprising in addition:
 a motor switch mounted on the handle between the duct and the base; and
 a second switch connected to the high voltage generator to control operation thereof, both of these switches being momentary-operation switches closed only while finger pressure is exerted on them.

10. The device of claim 7, in which the barrier means comprises a plurality of substantially parallel insulating bars across the annular duct near one end thereof, the electrode means being located between that end of the duct and the fan.

11. A method of destroying insects, said method comprises the steps of:
 generating an air stream;

providing a first and second grid means such that said second grid means is upstream of said first grid means;

allowing an insect to be drawn sufficiently far through said second grid means, having substantially larger openings than said first grid means; and electrically shocking said insect when said insect makes simultaneous electrical contact with said first and second grid means.

* * * * *